United States Patent
Hollister et al.

(10) Patent No.: US 8,791,824 B2
(45) Date of Patent: Jul. 29, 2014

(54) METHOD FOR READING RFID TAGS USING DIRECTIONAL ANTENNAS

(76) Inventors: Allen Hollister, La Habra, CA (US);
Gary Barta, Duarte, CA (US); John T. Armstrong, Pasadena, CA (US)

( * ) Notice: Subject to any disclaimer, the term of this patent is extended or adjusted under 35 U.S.C. 154(b) by 313 days.

(21) Appl. No.: 11/502,773

(22) Filed: Aug. 14, 2006

(65) Prior Publication Data

US 2008/0042847 A1 Feb. 21, 2008

(51) Int. Cl.
*G08B 13/14* (2006.01)

(52) U.S. Cl.
USPC ......... 340/572.7; 340/10.1; 342/42; 342/371; 342/463

(58) Field of Classification Search
USPC ............. 340/572.1–572.9, 10.1–109; 342/42, 342/44, 51, 126, 318, 371, 372, 463, 465, 342/359–360, 146, 107
See application file for complete search history.

(56) References Cited

U.S. PATENT DOCUMENTS

| | | | |
|---|---|---|---|
| 5,280,286 A * | 1/1994 | Williamson | 342/44 |
| 6,552,661 B1 * | 4/2003 | Lastinger et al. | 340/572.1 |
| 6,693,511 B1 * | 2/2004 | Seal | 340/10.1 |
| 6,782,277 B1 * | 8/2004 | Chen et al. | 455/562.1 |
| 6,922,173 B2 * | 7/2005 | Anderson | 343/701 |
| 2005/0110641 A1 * | 5/2005 | Mendolia et al. | 340/572.7 |

* cited by examiner

*Primary Examiner* — Daniel Wu
*Assistant Examiner* — Edny Labbees
(74) *Attorney, Agent, or Firm* — Philip T. Virga (57) ABSTRACT

A method and system for reading RFID tags in a high-density environment using a directional scanning antenna system is provided. The directional scanning antenna system consists of transmit and receive antennas having highly directional antenna patterns which work together to read and locate the tags. In operation both types of antennas are stepped in a circular fashion with respect to each other wherein the transmit antenna's antenna pattern pauses during rotation while the receive antenna pattern sweeps across the radiating antenna's path produced by the transmit antenna such that the antenna patterns produced from each isolate and determine the location of the tags.

18 Claims, 8 Drawing Sheets

FIG. 1

PRIOR ART

METHOD FOR READING RFID TAGS USING DIRECTIONAL ANTENNAS

FIELD OF THE INVENTION

This invention relates generally to a system for fast accurate reading of radio frequency identification (RFID) tags in a high-density environment. More particularly, the system reads RFID tags using directional antennas that provide accurate location information.

BACKGROUND

Figure 1:
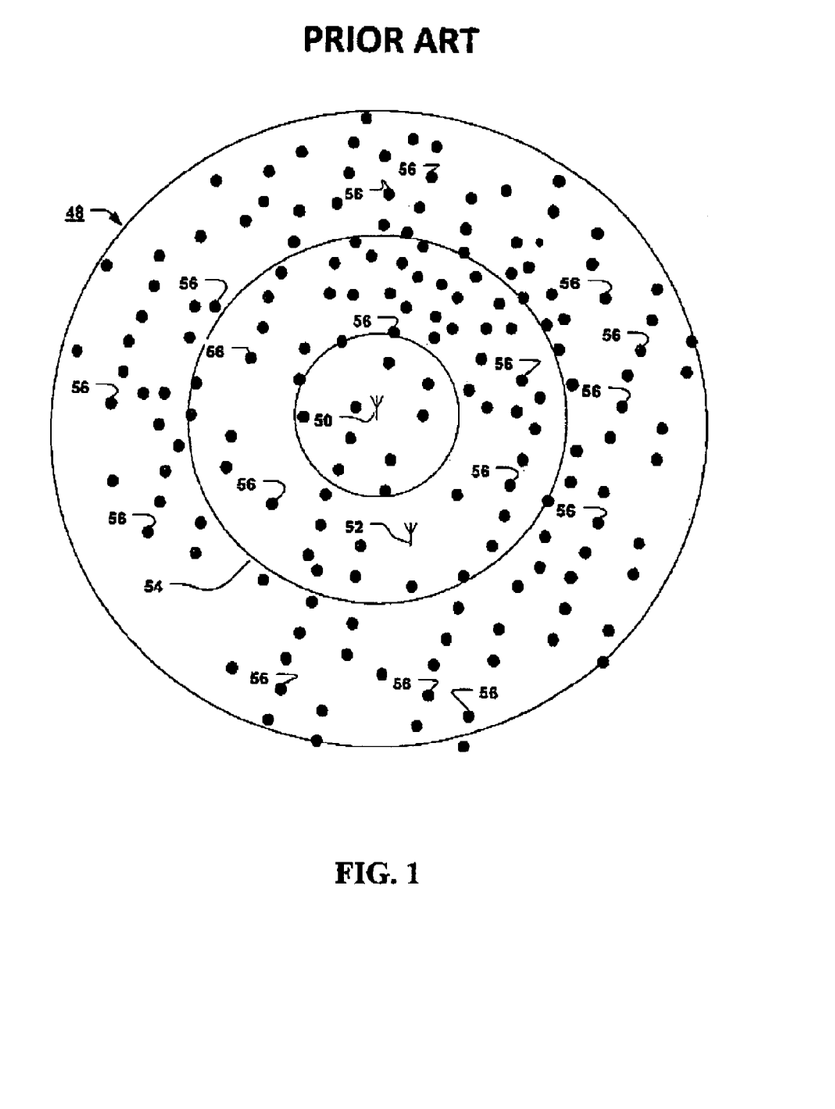
FIG. 1 graphically illustrates a system for identifying RFID tags in a high density tag environment.

FIG. 1 graphically illustrates a simplified prior art system 48 for identifying RFID tags 56 in a high tag density environment having unequally spaced RFID tags 56 using isotropic transmit and receive antennas 50 and 52. The transmit antenna 50 emits an RF wavefront 54 which acts as an RF interrogation signal 54. This interrogation signal 54 causes all the RFID tags 56 within the transmitting radius to respond by sending an encoded RF signal with the tag's ID number and optionally other data stored on the tag 56. The receive antenna 52 then receives this encoded signal response from the tag 56 and sends it on to the rest of the system 48. The receive antenna 52 may be separate from or part of the structure containing the transmit antenna 50. When multiple tags all transmit at the same time, they interfere with each other causing read errors, which in turn causes many retransmits to occur. In the worst-case, the number of successful reads goes to zero.

Because the FCC limits the amount of power that may be transmitted, and because in many systems the tags are passive, i.e. they rely on the transmitted RF power to obtain the power they require for operation and retransmission of tag information, the range is quite limited if the antenna structures are isotropic. In order to cover large geographic areas, this forces a large number of reader/transmitters. Therefore a need exists to replace isotropic antennas with directional antennas to solve these and other problems when reading RFID tags in a high-density environment.

SUMMARY

A method and system for reading RFID tags in a high-density environment using a directional scanning antenna system is provided. The directional scanning antenna system consists of transmit and receive antennas having highly directional antenna patterns which work together to read and locate the tags. In operation both types of antennas are stepped in a circular fashion with respect to each other wherein the transmit antenna's antenna pattern pauses during rotation while the receive antenna's antenna pattern sweeps across the radiating antenna's path produced by the transmit antenna such that the antenna patterns produced from each isolate and determine the location of the tags.

Other features and advantages will be apparent to one skilled in the art given the benefit of the following disclosure.

DETAILED DESCRIPTION OF THE DRAWINGS

A major problem for reading tags in a high density tag environment using the prior art system 48 shown in FIG. 1 is that all the tags 56 try to respond at once since all the tags 56 are radiating. More specifically, as the RF interrogation signal 54 strikes each tag 56, each tag 56 immediately responds in an attempt to communicate. Because all the tags 56 are responding at the same time, many collisions result, causing many retransmits to occur. In fact, so many retransmits are occurring that almost none of the data is able to get through to the receiver. The result is very low throughput and higher levels of inaccuracy.

Figure 2:
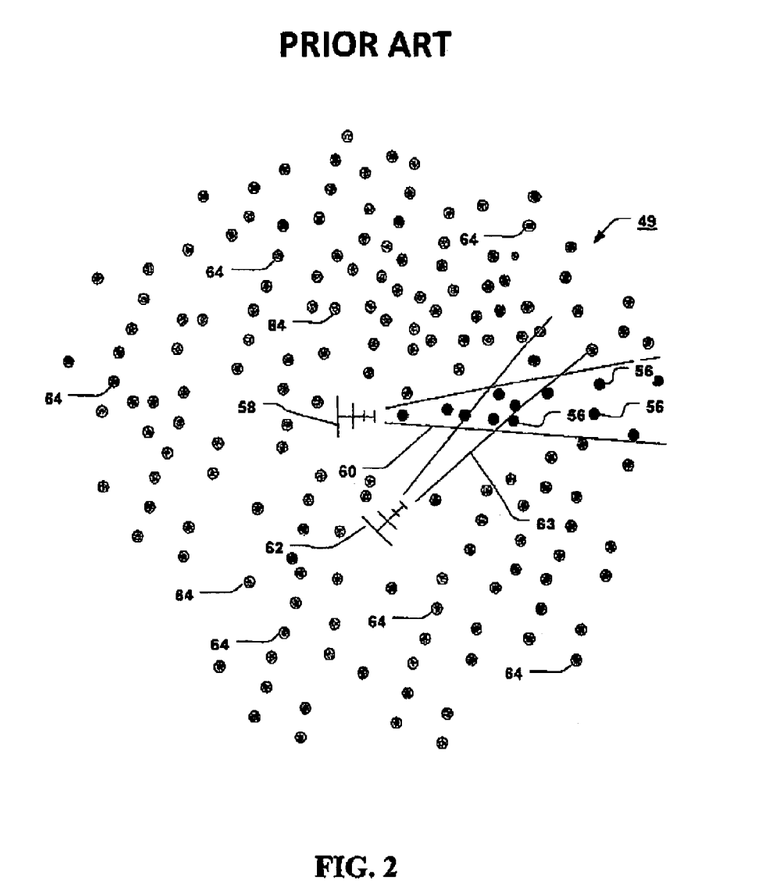
FIG. 2 graphically illustrates using directional transmit and receive antennas in the antenna system shown in FIG. 1.

FIG. 2 graphically illustrates a directional antenna system 49 using transmit and receive directional antennas 58 and 62 respectively, to overcome the disadvantages of the system described in FIG. 1. Referring now to FIGS. 1 and 2, the transmit antenna 58 is directional and transmits a directional narrow beam antenna pattern (similar to a flashlight beam) having an RF interrogation signal 54 along a geographically restricted direction 60. It is only within this region 60 that the tags 56 receive enough RF energy to generate a response and radiate back their ID number to the receive antenna 62. The receive antenna 62 is also directional, and won't see tags, even if they are radiating if they are not in the receive antenna's RF antenna pattern 63. All other tags 64 not within this path are non-radiating as they don't see the RF interrogation signal 54.

Figure 3A:
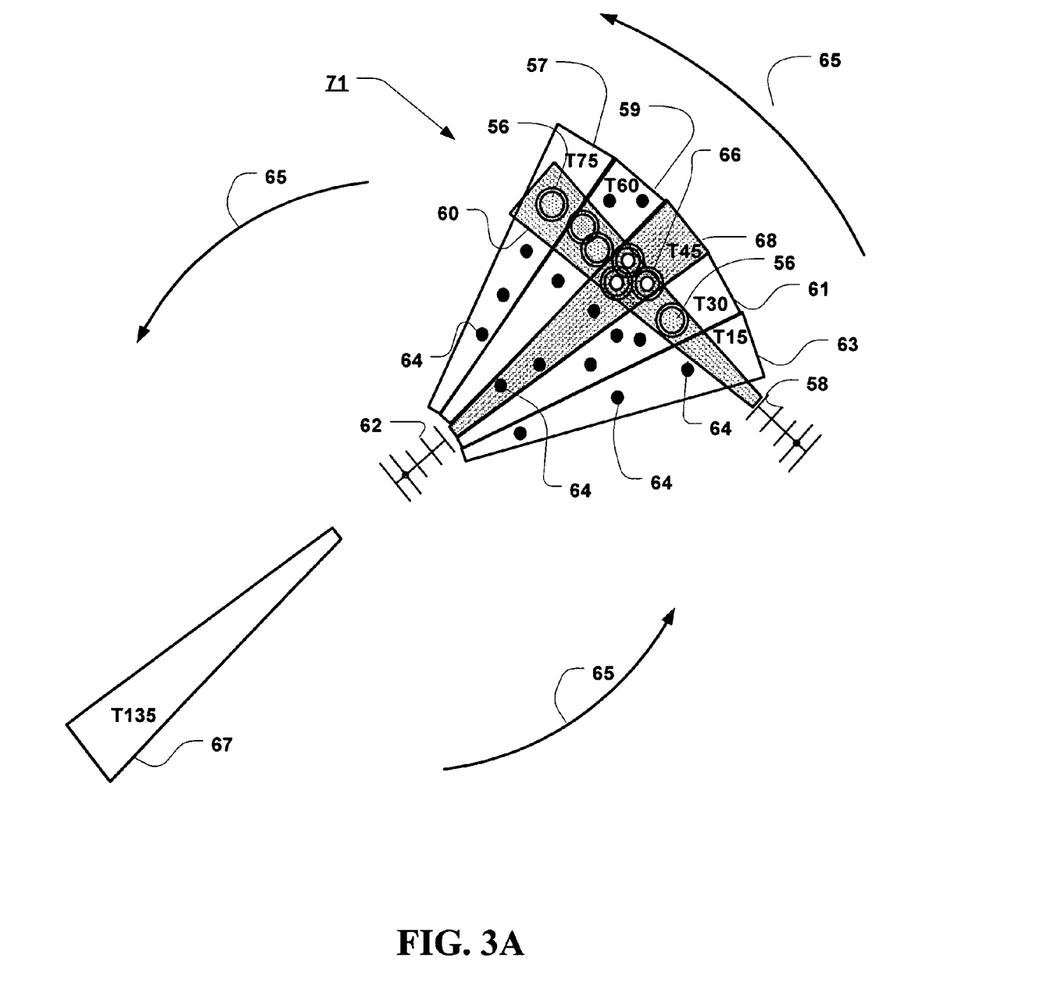
FIG. 3A graphically illustrates one example of using the receive antennas' directional antenna patterns to read RFID tags using the antenna system shown in FIG. 2.
Figure 3B:
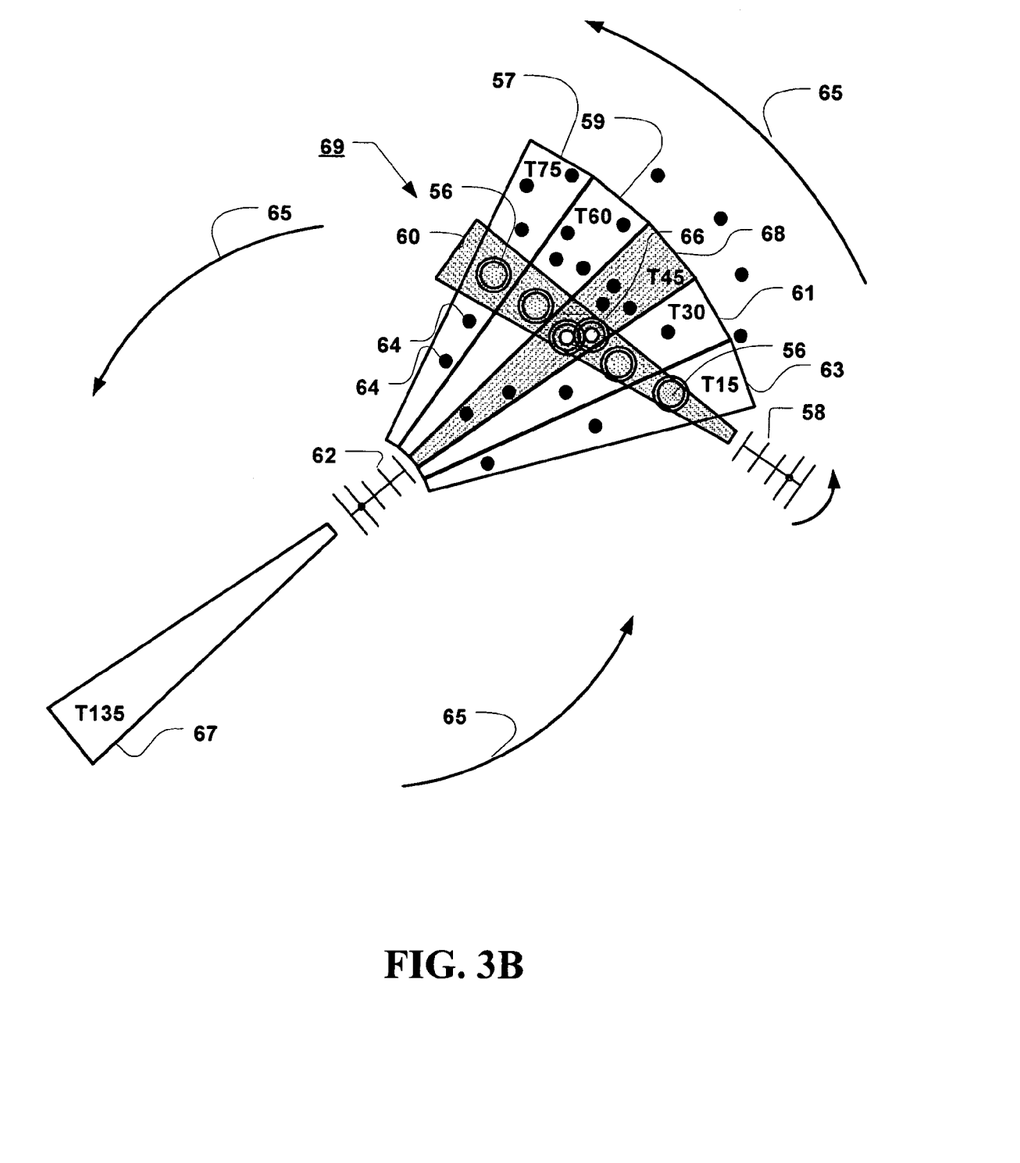
FIG. 3B graphically illustrates one example of using the transmit antennas' directional antenna pattern to read RFID tags using the antenna system shown in FIG. 2.

The directional antenna system 49 described in FIG. 2 scans or sweeps the antenna patterns of the directional antennas as is graphically illustrated in FIGS. 3A and 3B. Referring now to FIG. 3A the transmit antenna 58 and receive antenna 62 work together to read and locate the tags 56. Both of the antennas are rotated or stepped in a circular fashion with respect to each other such that the antenna patterns produced from each isolate and determine the location of the tags 56. By way of example and in operation the transmit antenna's 58 antenna pattern 60 pauses during rotation while the receive antenna pattern 68 having a beam width of fifteen degrees sweeps 65 across the radiating transmit antennas path by stepping and rotating at intervals T15 63, T30 61, T45 68, T60 59, T75 57 and T135 67 defining a circular pattern having twenty four intervals. As shown in FIG. 3A the receive antenna pattern 68 sweeps across the radiating transmit antenna's path 60 produced by the transmit antenna 58 thereby reading the illuminated tags 66 at the intersection of the two antenna patterns 60 and 68.

Referring to FIG. 3B the transmit antenna's 58 antenna pattern 60 is now rotated to its next position in a circular fashion and once again the receive antenna pattern 68 having a beam width of fifteen degrees sweeps 65 across the radiating transmit antenna's next location path by stepping and rotating at intervals T15 63, T30 61, T45 68, T60 59, T75 57 and T135 67 once again defining a circular pattern having twenty four intervals. As shown in FIG. 3B the receive antenna patterns sweeps 65 across the radiating transmit antennas path 60 produced by the transmit antenna 58 thereby reading the illuminated tags 66 at the intersection of the two antenna patterns 68 at the new transmit antenna's antenna patterns 60 location. Using this method and changing the size of the beam width of either antenna the number of tags 56 that are competing to be read by the tag receiver 62 may be greatly reduced dramatically lessening the number of collisions and reducing the number of required retransmits. This creates an orderly fashion for reading all the tags 56 and 64, allowing the tags 56 to be read much faster and more accurately than if all the tags 56 and 64 were contending for the receive antenna's 62 attention simultaneously.

Figure 4:
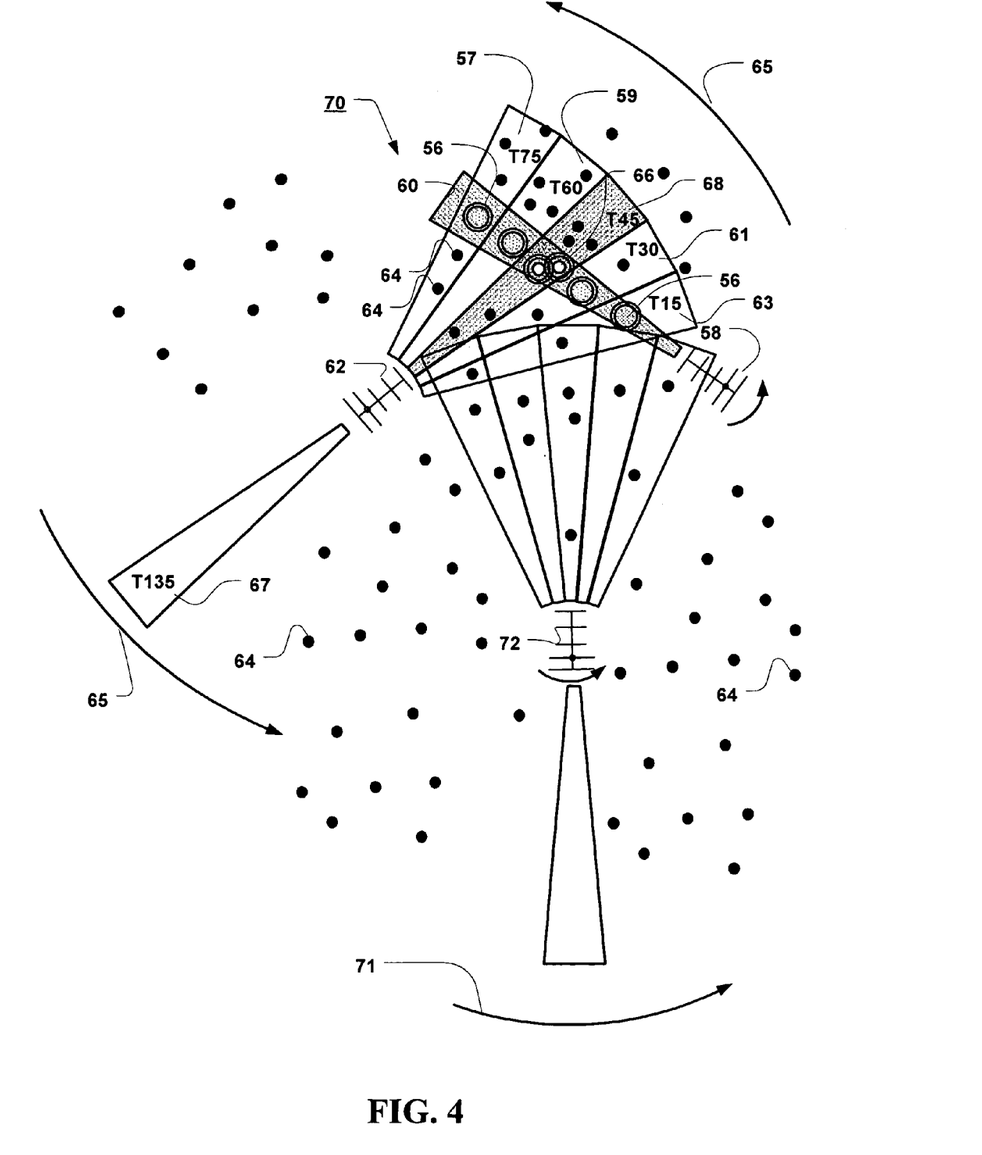
FIG. 4 graphically illustrates yet another example of using an additional receive antenna's directional antenna patterns to read RFID tags using the antenna system shown in FIG. 2

Referring once again to FIG. 1, because the directional antenna system 49 knows the direction of the pattern of the two antennas 58 and 62, and it knows the location of these two antennas, the location of the radiating tags 66 may be determined using simple triangulation techniques. FIG. 4 graphically illustrates one possible layout for a large room containing tags and multiple receiver/transmitters. The range for any given transmitter 58 and receiver 62 systems is fairly limited. Thus multiple transmitters 58 and receivers 62 are required to cover a large floor area. Referring to FIG. 4, a receivers 62 area of effective reception 70 produced by sweeping its antenna pattern in a full circle where a tag that is responding in this area will be heard by the receiver 62 is shown. For adequate coverage, the receivers in the vicinity of a transmitting tag must have coverage represented by all the receiver area of effective radius that completely covers an individual transmit radius range. In addition, there must be sufficient overlap to make sure that the degenerate condition of a receiver antenna pattern does not lie along a single line with respect to a transmit antenna pattern line.

For example, a receive antenna 62 on the left with an antenna pattern pointed at 90° in conjunction with the transmit antenna 58 on the right whose antenna pattern is pointed at 270°, receive antenna 62 and transmit antenna 58 pointing at each other, would constitute such a degenerate condition. In this situation, there are an infinite number of points, along this line, where a tag could occur. In addition, all tags along this line would attempt to transmit and be interrogated, causing multiple collisions of tag responses, negating the reason for using separate, directional antennas, 58 and 62. For this reason, it is necessary to have additional receive antenna 72 present. Therefore, to compute tag position, there must be at least one other receive antenna pattern line that crosses the transmit antenna pattern line at a non-zero degree angle. FIG. 4 illustrates an example for solving this problem with a receiver/transmitter geometry having a directional antenna system with two receive antennas 62 and 72 located for each transmit antenna 58 thereby providing sufficient antenna pattern overlap. These antennas need to be positioned such that there is always a receive antenna pattern that crosses at some angle other than 0°, with respect to the transmit antenna pattern. Turning once again to FIG. 4 there is shown two receive antennas for each transmit antenna wherein as the transmit antenna rotates around, different receive antennas are required to locate and read all of the tags in the radius surrounding the transmit antenna.

Depending on FCC ERP (Effective Radiated Power) limits on transmit power for a given frequency band, desired speed to read all the tags in the area, desired position accuracy for each tag, and total system costs, a number of other geometries for reader/transmitter placements are possible wherein some of these antenna systems may have different ratios of receivers to transmitters. Depending on the antenna system, transmit antennas may become receive antennas, and vice versa. All of the antennas rotate their patterns in a circle in order to contain the number of tags interrogated at any particular time to a manageable number. This provides flow control, and allows multiple tags to be read very quickly, because the receivers are not being overwhelmed by multiple tag responses.

Figure 5:
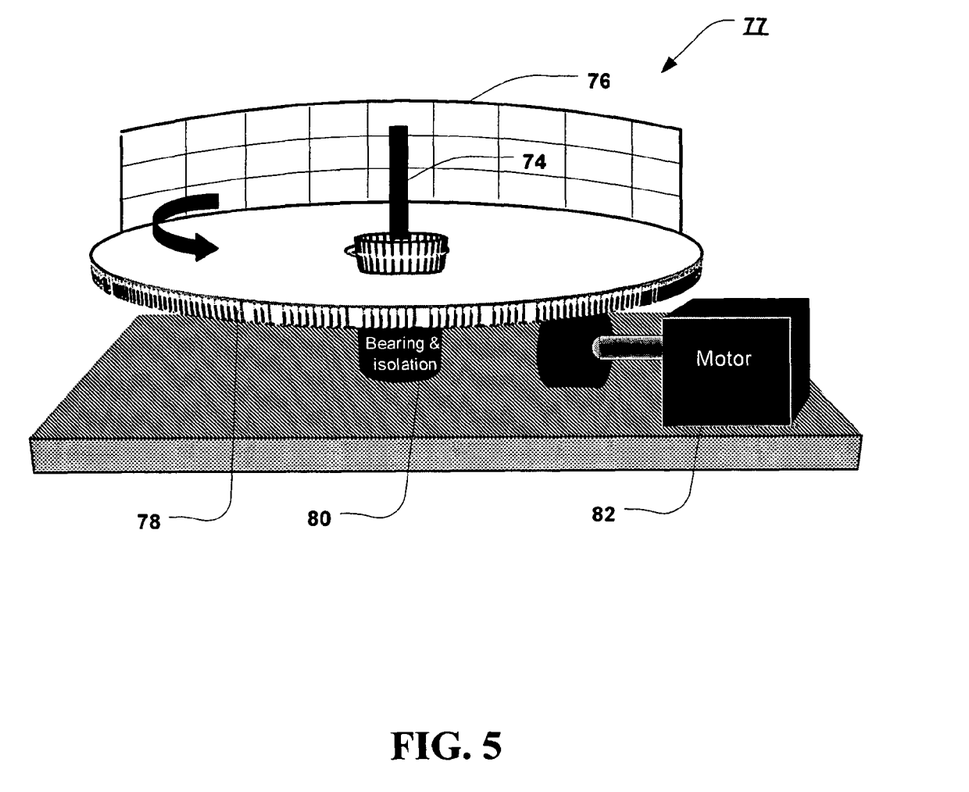
FIG. 5 is graphically shows an example of a mechanical rotating antenna system which may be used as either the transmit antenna, receive antenna or both for reading RFID tags.

There are many ways to implement directional antenna systems that may be either mechanical or electrical antenna systems that have a rotating, narrow beam antenna pattern. Referring now to FIG. 5 there is graphically shown one such example of a mechanical rotating antenna system 77 which may be used as either the transmit antenna, receive antenna or both for reading RFID tags. The active part of the antenna system 77 consists of a single isotropic radiator 74 tuned to the desired frequency for transmission. Placed in association with the radiator 74 is a parabolic reflector 76 that is mounted in conjunction with radiator 74 to a rotating platform 78. This platform 78 rests on a bearing system 80 that is turned by a motor 82, which by way of example may be a stepper motor. The bearing system 80 additionally provides RF coupling to radiator 74 while the platform 78 and parabolic reflector 76 rotate.

In operation, the combination of radiator 74 with the parabolic reflector 76 provides directionality to the antenna pattern, wherein as the platform 78 is rotated with reflector 76, the antenna pattern also rotates. Therefore, by rotating the reflector 76 around the radiator 74, the direction of the beam may be precisely positioned just like pointing a flashlight in a given direction precisely positions a flashlight beam. It should be understood that any reflector might be used such as a corner reflector, or some other kind of antenna structure that in conjunction with the active antenna radiator 74 creates a narrow RF beam, much like a parabolic reflector in a flashlight creates a beam of light.

Figure 6:
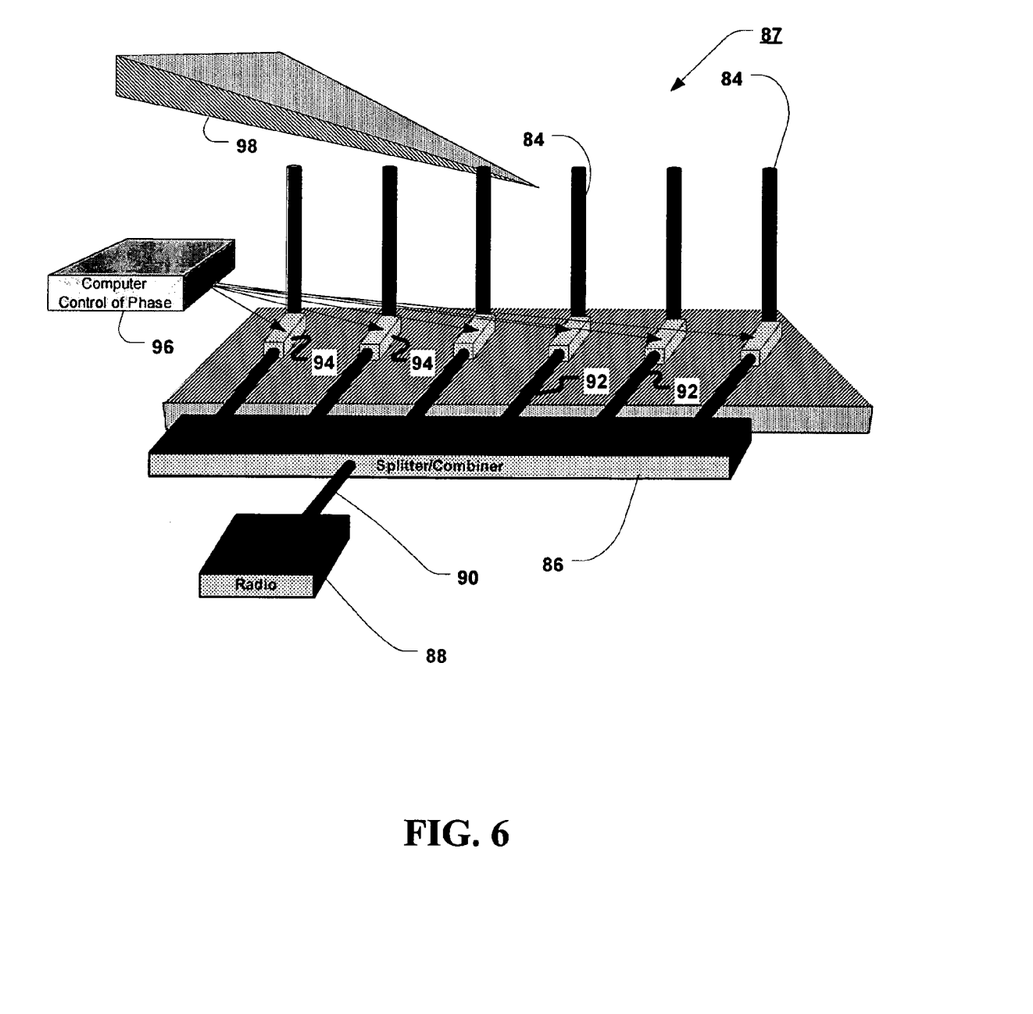
FIG. 6 graphically shows an example of an electrical phased array antenna system which may be used as either the transmit antenna, receive antenna or both for reading RFID tags.

Referring to FIG. 6 there is graphically shown another example of an electrical scanning phased array antenna system 87 which may be used as either the transmit antenna, receive antenna or both for reading RFID tags. Turning now to FIG. 6, the electrical scanning phased array antenna 87 is an array antenna consisting of a plurality of antenna radiators 84. By adjusting the phase of the RF signal to each antenna radiator 84 the direction of the antenna pattern 98 may be changed as desired. This phase adjustment may be accomplished using a computer controller 96 that controls individual electronic programmable phase control modules 94 which change the phase of the RF signal to each individual antenna radiator 84.

Transmission lines 92 from the programmable phase modules 94 to a power splitter/combiner 86 allows the antenna to be used as either a transmit antenna or receive antenna electrically connected through transmission line 90 to a radio 88 for generating or receiving RF signals. By controlling the phase of the RF signal to the various radiators 84, the direction 98 of the beam may be precisely achieved. The number of radiators 84 determines the narrowness of the beam. The advantage of this technique over the mechanical technique is that there are no moving parts to wear out. The disadvantage of this technique is that the electronic system is more complex.

Figure 7:
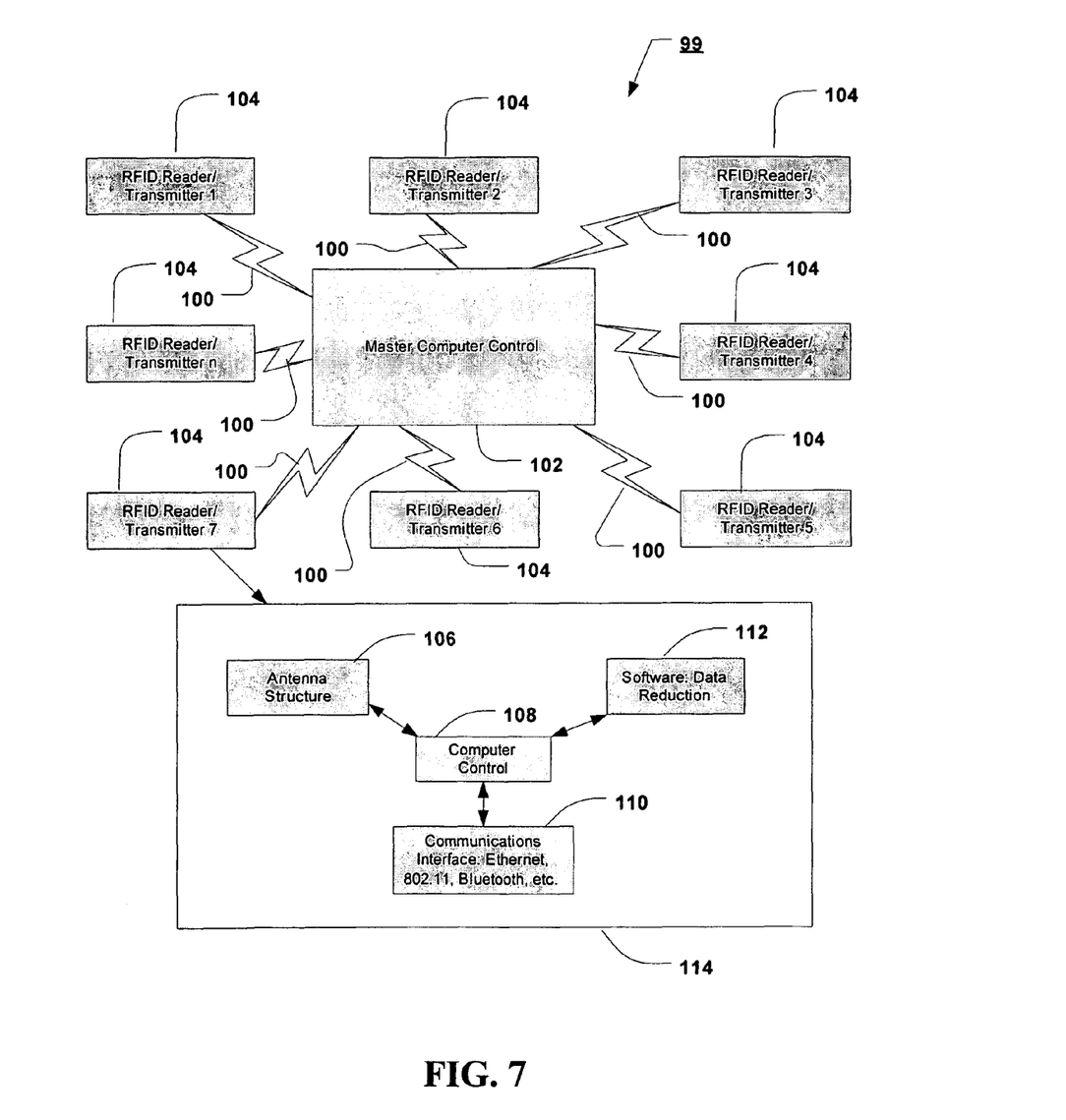
FIG. 7 is a block diagram showing a completed directional scanning antenna system.

Referring now to FIG. 7 a block diagram is provided showing a completed directional antenna system 99 wherein the combination of the receiver/transmitter antennas described above have an associated electronics package 114 both of which in combination form RFID reader/transmitter modules 104 which are linked to a master computer controller 102. The master computer controller 102 links to all of the RFID reader/transmitter modules 104 through a variety of different kinds of communication links 100 which may be by way of example Ethernet, IEEE 802.11, Bluetooth, or any other communication structure that may support digital communication. The associated electronics 114 within the RFID reader/transmitter modules 104 consist of a computer controller 108 which controls a given antenna structure 106 whether mechanical or electrical as described above and further communicates to the master computer controller 102 over a communication interface 110. The computer controller 108 contains a significant amount of software for data reduction and control of other modules 112.

Turning once again to FIG. 7, when multiple transmitters and readers are used the master computer controller 102 coordinates the efforts of all of the RFID reader/transmitters 104. First, however, an individual reader/transmitter 104 is capable of controlling its own movement and of reading the tags within its effective radius wherein the master computer controller 102 obtains data from each reader/transmitter over the communication link 100 and uses this data to compute the location of all of the tags because it knows the location of all of the RFID reader/transmitters 104. Multiple reader/transmitters may receive the same tag information wherein this repetitious data may be used by the master computer controller 102 to more accurately compute (using averaging and other numerical techniques) the location of an individual tag.

Additionally, the master computer controller 102 may also direct individual RFID reader/transmitters 104 which direction to point their antenna patterns. In this way, degenerate condition of both the reader and transmit antenna pattern being along the same line may be avoided. This also allows the master computer controller 102 to track movement of products as they move around an area by specifically directing individual reader/transmitters to set their particular antenna patterns in a particular direction. The master computer controller 102 keeps track of all of the tags in the room, and then passes this information up the chain to higher level, database management programs. It performs whatever data translations are necessary for these database programs to be effective.

Describing once again in detail the method of identifying RFID tags, the number of tags that may be seen by the receiver is dramatically limited, because only those tags that are within the current antenna pattern 60 will reradiate in an attempt to communicate. In addition, only those tags that are radiating and are in the receive antennas current antenna pattern 68 will be seen by the receiver. This dramatically limits the number of tags that are contending for the reader at any one particular time. Therefore, very few collisions, and very few retransmits are required. The system works by placing the transmit antenna 58 in one particular direction while placing the receive antenna pattern 68 such that it intersects the transmit antenna pattern 60. After all the tags have been read from this particular intersection, the receive antenna pattern 68 is rotated slightly until it intercepts the transmit antenna pattern 60 at a point different from the previous point. At this time a new set of tags is read at the new intersection of the receive antenna pattern and the transmit antenna pattern. This continues until all of the tags that are currently illuminated by the transmit antenna pattern have been read. At this point, the transmit antenna pattern is rotated slightly in order to illuminate a new set of tags. The process begins again as the receive antenna pattern is now rotated across this new path.

It should be noted that this technique will work with any tag from any manufacturer, as long as it is designed to operate on the same frequency as the transmit and receive antennas and radios. There are no special protocols required by the tags to make this work. All of the flow control is contained within the antenna structures and its computer control. However, the use of a directional scanning antenna system does not preclude the use of additional techniques for providing flow control. In fact, the system is perfectly compatible with other techniques that might require special algorithms on the tags themselves in order to operate properly.

Another benefit of using a directional scanning antenna system involves range and the number of reader/transmitters required. Because the FCC limits the amount of power that may be transmitted, and because in many systems the tags are passive, i.e. they rely on the transmitted RF power to obtain the power they require for operation and retransmission of tag information, the range is quite limited if the antenna structures are isotropic. In order to cover large geographic areas, this forces a large number of reader/transmitters. By using a directional scanning antenna system, the antennas are directional implying they provide gain. If both the transmit antenna and the receive antenna are allowed to have gain, the range may be increased substantially over that of an isotropic radiator. For example, 6 dB of antenna gain will increase the range by a factor of two (an increase in swept area of 4) everything else being equal. A gain of 20 dB would result in range increase of almost a factor of 10 (an increase in swept area covered by a given reader/transmitter of 100). This could dramatically lower the number of reader/transmitters required to cover a given floor space thereby reducing overall system cost.

Yet another benefit of using a directional scanning antenna system is the ability to positionally locate individual tags. Because the location of the read and transmit antennas are known, and because only those tags that exist at the intersection of the two antenna patterns from the read and write antennas will be received, simple triangulation may be used to determine the location of this intersection and hence any tags at the intersection which results in tracking and locating objects that are attached to the tags.

A directional scanning antenna system has been described which requires the ability to create narrow beam antenna patterns directed in a given direction under computer control for reading or identifying RFID tags. The directional scanning antenna system may be as complex as having the antenna structure make transmit antennas into receive antennas and vice-versa. This may be used to create geometries that have fewer reader/transmitter structures (cost savings) at the expense of less tag read throughput. Additionally, it is envisioned that the antenna system create more complex antenna patterns such as multiple lobe antenna patterns (perhaps with different lobes having different polarizations) that would enable higher tag read throughput at the expense of more system cost.

It is also possible to eliminate the master computer controller by distributing the functions this computer performs across all of the individual reader/transmitter computers. Such a distributed system may be made to perform the same function as a centralized computer such as the master computer controller. The choice to use a distributed system or a central system is irrelevant to the method of reading or identifying RFID tags using a directional scanning antenna system and would be determined based on marketing needs.

The invention may be embodied in other specific forms without departing from its spirit or essential characteristics. The described embodiments are to be considered in all respect only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A system for reading RFID tags in a high-density environment comprising:
   one or more of transmit antennas, each transmit antenna defining a highly directional antenna pattern;
   one or more of receive antennas, each receive antenna defining a highly directional antenna pattern; and
   wherein stepping said transmit and receive antennas in a circular fashion with respect to each other by pausing the transmit antenna's antenna pattern during rotation while the receive antenna pattern sweeps across radiating antennas path produced by the transmit antenna such that the antenna patterns produced from each isolate and determine location of the RFID tags.

2. A system for reading RFID tags in a high-density environment according to claim 1, further comprising:
   determining location of the RFID tags using triangulation techniques.

3. A system for reading RFID tags in a high-density environment according to claim 1, further comprising:
   at least one receive antenna pattern line that crosses the transmit antenna pattern line at a non-zero degree angle.

4. A system for reading RFID tags in a high-density environment according to claim 1, further comprising:
   one or more transmit antennas may be used as receive antennas.

5. A system for reading RFID tags in a high-density environment according to claim 1, further comprising:
   one or more receive antennas may be used as transmit antennas.

6. A system for reading RFID tags in a high-density environment according to claim 1, wherein said antenna patterns are generated mechanically by:
   an isotropic radiator in association with a parabolic reflector that is mounted in conjunction with said radiator to a rotating platform wherein said platform rests on a bearing system that is turned by a motor and provides RF coupling to said radiator while said platform and parabolic reflector rotate wherein in operation said radiator with said parabolic reflector provides directionality to said antenna pattern by rotating said reflector around said radiator wherein said direction of said antenna pattern may be precisely positioned.

7. A system for reading RFID tags in a high-density environment according to claim 1, wherein said antenna patterns are generated electronically by:
   one or more electronic phased array antennas consisting of a plurality of antenna radiators wherein by adjusting phase of RF signal to each said antenna radiator a direction of said antenna pattern may be changed as desired and amount of antenna radiators determines antenna pattern narrowness of a beam.

8. A method for reading RFID tags in a high-density environment comprising:
   transmitting highly directional antenna patterns produced by one or more transmit antennas;
   generating highly directional receive antenna patterns from one or more receive antennas; and
   stepping said transmit and receive antennas in a circular fashion with respect to each other by pausing the transmit antenna's antenna pattern during rotation while the receive antenna pattern sweeps across radiating antennas path produced by the transmit antenna such that the antenna patterns produced from each isolate and determine location of the RFID tags.

9. A method for reading RFID tags in a high-density environment according to claim 8, further comprising:
   determining location of the RFID tags using triangulation techniques.

10. A method for reading RFID tags in a high-density environment according to claim 8, further comprising:
    providing at least one receive antenna pattern line for crossing the transmit antenna pattern line at a non-zero degree angle.

11. A method for reading RFID tags in a high-density environment according to claim 8, further comprising:
    using one or more transmit antennas as receive antennas.

12. A method for reading RFID tags in a high-density environment according to claim 8, further comprising:
    using one or more receive antennas as transmit antennas.

13. A method for reading RFID tags in a high-density environment according to claim 8, wherein generating said antenna patterns further comprise:
    mounting an isotropic radiator in association with a parabolic reflector to a rotating platform; and
    rotating said reflector around said radiator wherein said direction of said antenna pattern may be precisely positioned wherein in operation said radiator with said parabolic reflector provides directionality to said, antenna pattern.

14. A method for reading RFID tags in a high-density environment according to claim 8, wherein generating said antenna patterns further comprise:
    arranging an array of antenna radiators to form an antenna pattern; and
    adjusting phase of an RF signal delivered to each said antenna radiator for changing direction of said antenna pattern as desired wherein an amount of antenna radiators determines antenna pattern narrowness of a beam.

15. A system for reading RFID tags in a high-density environment comprising:
    one or more radio frequency tags;
    a transmit antenna defining a highly directional antenna pattern whose highly directional pattern may illuminate said one or more radio frequency tags;
    a receive antenna defining a highly directional antenna pattern wherein stepping said receive antenna in a circular fashion with respect to said transmit antenna's antenna pattern during rotation sweeps across radiating transmit antenna's path produced by the transmit antenna such that the antenna patterns produced from each isolate and determine location of the RFID tags determining location of the RFID tags using triangulation techniques.

16. A system for reading RFID tags in a high-density environment according to claim 15, wherein stepping said transmit antenna's antenna pattern a single circular step and stepping said receive antenna in a circular fashion with respect to said transmit antenna's antenna pattern during rotation sweeps across the radiating transmit antennas path produced by the transmit antenna such that the antenna patterns produced from each isolate and determine location of the RFID tags determining location of the RFID tags using triangulation techniques.

17. A system for reading RFID tags in a high-density environment according to claim 15, wherein for each transmit antenna there is provided two receive antennas.

18. A system for reading RFID tags in a high-density environment according to claim 15, wherein an additional receive antenna is provided and located to produce a receive antenna pattern line that crosses an transmit antenna pattern line at a non-zero degree angle.

* * * * *